United States Patent [19]

Audeh et al.

[11] Patent Number: 5,034,203

[45] Date of Patent: * Jul. 23, 1991

[54] REMOVAL OF MERCURY FROM NATURAL GAS UTILIZING A POLYSULFIDE SCRUBBING SOLUTION

[75] Inventors: Costandi A. Audeh, Princeton; Francis P. Ragonese, Cherry Hill, both of N.J.

[73] Assignee: Mobil Oil Corporation, Fairfax, Va.

[ * ] Notice: The portion of the term of this patent subsequent to May 30, 2006 has been disclaimed.

[21] Appl. No.: 343,691

[22] Filed: Apr. 27, 1989

[51] Int. Cl.$^5$ ............... B01D 47/02; C01G 13/00
[52] U.S. Cl. ................................. 423/210; 423/101
[58] Field of Search ............... 423/210, 101; 210/914

[56] References Cited

U.S. PATENT DOCUMENTS

| | | | |
|---|---|---|---|
| 3,194,629 | 7/1965 | Dreibelbis et al. | 423/210 |
| 3,331,657 | 7/1967 | Peter et al. | 423/242 |
| 3,817,713 | 6/1974 | Ionescu | 423/210 |
| 4,147,626 | 4/1979 | Findlay et al. | 423/101 |
| 4,764,219 | 8/1988 | Yan | 423/210 |
| 4,786,483 | 11/1988 | Audeh | 423/210 |
| 4,834,953 | 5/1989 | Audeh | 423/210 |

FOREIGN PATENT DOCUMENTS

| | | | |
|---|---|---|---|
| 110983 | 9/1978 | Japan | 423/210 |
| 325980 | 1/1971 | U.S.S.R. | |
| 833287 | 10/1979 | U.S.S.R. | |

*Primary Examiner*—Michael L. Lewis
*Assistant Examiner*—Brian M. Bolam
*Attorney, Agent, or Firm*—Alexander J. McKillop; Charles J. Speciale

[57] ABSTRACT

Natural gas, particularly gas to be processed in liquefied natural gas plants, is treated to remove residual mercury by scrubbing with an aqueous solution containing alkali metal polysulfide and sufficient pH adjusting compound to maintain the pH above 8.4.

11 Claims, No Drawings

REMOVAL OF MERCURY FROM NATURAL GAS UTILIZING A POLYSULFIDE SCRUBBING SOLUTION

This invention relates to a modification or a process for purifying a natural gas. The process includes an additional step removing trace amounts of mercury from natural gas before it is liquefied.

Raw natural gas must be treated prior to its liquefaction to remove undesirable contaminants. These contaminants include compounds that interfere with the liquefaction process, with the separation and recovery of hydrocarbon liquids and with meeting the specification set for the recovered products. For example, the gas must be dried to prevent ice formation during cryogenic operations. Hydrogen sulfide ordinarily must be removed because of its toxic nature.

A large number of commercial processes are in use for treating and separating raw natural gas The individual steps used in these different processes are well-known to those skilled in the art.

The mercury level of natural gas is reported in the literature to be as high as 450 micrograms per cubic meter. Typically, natural gas is treated in liquefied natural gas (LNG) plants with caustic or carbonate solutions in order to remove $CO_2$ and $H_2S$. The treated gas then contacts a liquid amine to complete $H_2S$ removal. Next, the gas is cooled in aluminum heat exchangers. Because large volumes of gas must flow through the aluminum heat exchangers, they represent very large capital investment. Therefore, it is important to prevent damage to these exchangers. One source of damage comes from the mercury present in the gas flowing through the heat exchangers. Even when the concentration of mercury is low, its effect is cumulative as it reacts by amalgamation with the aluminum. The result is damage to the heat exchangers. For example, amalgamation may cause corrosion cracking, which can lead to equipment failure, fires, and similar catastrophes. The problem of mercury in natural gas is discussed further in U.S. Pat. No. 4,094,777 and French Patent 2,310,795.

In the prior art, the most frequently used adsorbent for removing mercury is sulfur impregnated on activated carbon. The reaction between the sulfur and mercury is:

It is important to recognize that this reaction is reversible, and that, although it is efficient, the extent of mercury removal is limited by the thermodynamic equilibrium. For instance, at 77° C. (170° F.), thermodynamic equilibrium dictates that the residual Hg in the gas stream cannot be lower than 0.03 ug/m$^3$ (ppb). Commercial experience has shown this level of mercury in the natural gas to be too high for critical equipment in LNG plants to tolerate when large volumes of gas are processed. Thus, further removal of the residual mercury is necessary.

It is also known to remove Hg with elemental sulfur but it has been believed that elemental sulfur must be present in large quantities to remove significant amounts of mercury from gases; see U.S. Pat. No. 3,194,629. In addition, co-pending, co-assigned U.S. patent application Ser. No. 188,088 filed Apr. 27, 1988 discloses the removal of trace levels of mercury from a gas with a hot aqueous carbonate solution containing 10 to 10,000 ppm elemental sulfur. There is, however, no suggestion that aqueous solutions containing low levels of a polysulfide will be effective for this purpose. The effectiveness of low levels of a polysulfide is disclosed and claimed for the first time in the present application.

There is a need, therefore, for a method of removing trace levels of mercury from a gas with low levels of an aqueous solution of polysulfide ion. It is the object of the present invention to provide such a method. It is a further object to provide such a process for natural gas after the natural gas has been pretreated with sulfur to remove a major portion of the mercury, and with an aqueous solution of an alkali metal carbonate and an amine solution to remove hydrogen sulfide.

SUMMARY OF THE INVENTION

These and other objectives as will be apparent to those of ordinary skill in the art have been met by providing a method for removing traces of mercury from a gas comprising the step of scrubbing the natural gas with an aqueous solution that comprises 5 to 10,000 parts per million by weight of alkali metal polysulfide at a pH above 8.4, preferably above 8.6.

More particularly, the objectives have been met by providing a method for removing mercury from mercury-containing natural gas comprising (a) contacting the natural gas with sulfur to remove a major portion of the mercury;

(b) contacting the natural gas with an aqueous solution of an alkali metal carbonate and an amine solution to remove hydrogen sulfide; and (c) scrubbing the so-treated natural gas with an aqueous solution comprising 5 to 10,000 parts per million by weight of alkali metal polysulfide and sufficient pH adjusting compound to maintain the pH above 8.4.

DETAILED DESCRIPTION OF THE INVENTION

The gas capable of benefiting from the present invention is typically a hydrocarbon gas, such as natural gas, that contains traces of mercury. The concentration of mercury in the gas may be as low as 0.03 ug/m$^3$ (ppb) and more typically as low as 0.06 ug/m$^3$ by weight. The concentration of mercury in the gas may be as high as 10 ug/m$^3$ preferably 0.08 ug/m$^3$ by weight.

The method of the present invention is particularly effective in removing traces of mercury from natural gas that has been pretreated to remove hydrogen sulfide, carbon dioxide and most of the mercury. Such a pretreatment typically comprises conducting raw natural gas through a primary mercury removal zone and a sweetening zone for removal of $H_2S$ and $CO_2$.

The primary mercury removal zone may, for example, contain sulfur, such as sulfur impregnated on activated carbon. The sweetening zone typically contains a solution of a carbonate such as an alkali metal carbonate and of an amine. In the combined process, natural gas feed is introduced into a carbon bed that contains free sulfur deposited on granulated carbon. The bed functions to fix or adsorb a large fraction of the mercury vapor present in the natural gas by interaction with the sulfur.

The effluent gas from the primary mercury treatment zone is then introduced into a sweetening zone containing, preferably, a hot aqueous solution of an alkali carbonate, preferably potassium carbonate, at a temperature of 93° to 149° C. (200° to 300° F.). These hot carbonate processes for sweetening natural gas are known in the art. Most of them contain a proprietary activator, for example the Benfield process, the Catacarb process and the Giammarco-Vetrocoke process. These processes are discussed in U.S. Pat. Nos. 4,150,962 and 4,070,165. The effluent gas from the hot carbonate process is fed to an amine treating unit for additional processing and removal of hydrogen sulfide.

The effluent from the amine treater is fed to a scrubbing tower into which an aqueous scrubbing solution is introduced to remove the residual mercury. The scrubbing solution comprises an effective amount of alkali metal polysulfide and sufficient pH adjusting compound to maintain a pH above 8.4 and preferably above 8.6. Examples of alkali metal polysulfide include sodium and potassium polysulfide. The scrubbing tower may be operated at a temperature of 20° to 70° C. and a pressure of 101 to 6900 kPa. The temperature is preferably 20° to 40° C., more preferably 23°–27° C.

As is known from prior art on the contacting of gas and liquid streams, the mercury removal efficiency is influenced by the degree of contacting employed or number of contacting stages. Therefore, the contacting procedure utilized in the scrubbing tower should provide intimate gas-liquid contacting equivalent to 1–10, preferably 3–10, equilibrium stages achieved via known contacting devices, e.g., mixers, high surface packing, etc. The amount of alkali metal polysulfide present in the aqueous scrubbing solution can be varied widely, depending on the circumstances. However, it should be borne in mind that a high polysulfide content may lead to the need for expensive hydrogen sulfide removal operations downstream. Preferably, the concentration of sulfur in the form of the alkali metal polysulfide in the scrubbing solution is 5 to 10,000 ppm by weight, and more preferably 10 to 200 ppm by weight.

After the scrubbing tower, the natural gas is fed to a dehydrator where water is removed. The dried natural gas is then fed to heat exchanger and other additional equipment necessary for liquefying the gas. The heat exchanger is normally made from aluminum, which must be protected from attack by mercury.

The following examples further illustrate the present invention.

EXAMPLE 1

A natural gas stream which had been contacted with the sulfur/activated carbon adsorber and amine treating unit was scrubbed with a solution containing 4300 ppm by weight of sulfur as sodium polysulfide. The scrubbing was conducted at 45° C. The concentration of mercury in the natural gas was reduced from 0.07 ug/m$^3$ to less than 0.01 ug/m$^3$.

EXAMPLE 2

Example 1 was repeated except the concentration of sulfur as sodium polysulfide is 2150 ppm by weight. The concentration of mercury in the natural gas was reduced from 0.07 ug/m$^3$ to less than 0.01 ug/m$^3$.

EXAMPLE 3

Example 1 was repeated except the concentration of sulfur as sodium polysulfide is 1075 ppm by weight. The concentration of mercury in the natural gas was reduced from 0.07 ug/m$^3$ to less than 0.01 ug/m$^3$.

EXAMPLE 4

Example 1 was repeated except the concentration of sulfur as sodium polysulfide is 500 ppm by weight. The concentration of mercury in the natural gas was reduced from 0.07 ug/m$^3$ to less than 0.01 ug/m$^3$.

EXAMPLE 5

Example 1 was repeated except the concentration of sulfur as sodium polysulfide is 250 ppm by weight. The concentration of mercury in the natural gas was reduced from 0.07 ug/m$^3$ to less than 0.01 ug/m$^3$.

EXAMPLE 6

Example 1 was repeated except the concentration of sulfur as sodium polysulfide is 25 ppm by weight. The concentration of mercury in the natural gas was reduced from 0.07 ug/m$^3$ to less than 0.01 ug/m$^3$.

We claim:

1. A method for removing traces of mercury from a gas comprising the step of scrubbing the natural gas with an aqueous solution that comprises 5 to 10,000 parts per million by weight of alkali metal polysulfide at a pH above 8.4.

2. The method of claim 1 wherein the gas is natural gas.

3. The method of claim 1 wherein the alkali metal polysulfide is sodium polysulfide or potassium polysulfide.

4. The method of claim 1 wherein the scrubbing is conducted at a temperature of 20° to 70° C. and a pressure of 101 to 6900 kPa.

5. The method of claim 4 wherein the scrubbing is conducted at a temperature of 20° to 40° C.

6. The method of claim 4 wherein the scrubbing is conducted at a temperature of 23° to 27° C.

7. The method of claim 1 wherein the scrubbing is conducted at a pH above 8.6.

8. A method for removing mercury from mercury-containing natural gas comprising
   (a) contacting the natural gas with sulfur to remove a major portion of the mercury;
   (b) contacting the natural gas with an aqueous solution of an alkali metal carbonate and an amine solution to remove hydrogen sulfide; and
   (c) scrubbing the so-treated natural gas with an aqueous solution comprising 5 to 10,000 parts per million by weight of alkali metal polysulfide and sufficient pH adjusting compound to maintain the pH above 8.4.

9. The method of claim 8 wherein the scrubbing is conducted at a pH above 8.6.

10. A method of producing liquefied natural gas containing less than 0.01 ug/m$^3$ mercury comprising:
    (a) contacting the natural gas with sulfur to remove a major portion of the mercury contained therein;
    (b) contacting the natural gas with an aqueous solution of an alkali metal carbonate and an amine solution to remove hydrogen sulfide;
    (c) scrubbing the so-treated natural gas with an aqueous solution comprising 5 to 10,000 parts per million by weight of alkali metal polysulfide and sufficient pH adjusting compound to maintain the pH above 8.4 to remove the residual mercury;
    (d) dehydrating the natural gas of step (c); and
    (e) liquefying the natural gas of step (d).

11. The method of claim 10 wherein the scrubbing is conducted at a pH above 8.6.

* * * * *